United States Patent
Lewis et al.

(10) Patent No.: US 10,635,804 B2
(45) Date of Patent: Apr. 28, 2020

(54) SECURED POWER AND DATA COMMUNICATIONS FOR AIRCRAFT COUPLED TO GROUND SYSTEMS

(71) Applicant: The Boeing Company, Chicago, IL (US)

(72) Inventors: Larry L. Lewis, Camano Island, WA (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 15/497,968

(22) Filed: Apr. 26, 2017

(65) Prior Publication Data

US 2018/0314818 A1    Nov. 1, 2018

(51) Int. Cl.
| | | |
|---|---|---|
| G06F 21/44 | (2013.01) | |
| H04B 3/00 | (2006.01) | |
| H04B 3/54 | (2006.01) | |
| H04B 3/56 | (2006.01) | |
| H04L 29/06 | (2006.01) | |
| G05B 15/02 | (2006.01) | |

(52) U.S. Cl.
CPC .............. *G06F 21/44* (2013.01); *H04B 3/00* (2013.01); *H04B 3/546* (2013.01); *H04B 3/56* (2013.01); *H04L 63/0428* (2013.01); *G05B 15/02* (2013.01); *H01R 2201/26* (2013.01); *H04B 2203/5487* (2013.01); *H04B 2203/5495* (2013.01)

(58) Field of Classification Search
CPC ........................................................ G06F 21/44
See application file for complete search history.

(56) References Cited

U.S. PATENT DOCUMENTS

| | | |
|---|---|---|
| 5,272,387 A | 12/1993 | Fiorina |
| 9,086,522 B1 | 7/2015 | Li et al. |
| 9,086,523 B2 | 7/2015 | Howe et al. |
| 9,436,569 B2 | 9/2016 | Lee et al. |
| 2004/0011918 A1* | 1/2004 | Musial ............... B64F 1/34 244/1 R |
| 2004/0140673 A1 | 7/2004 | McCool |
| 2012/0309214 A1 | 12/2012 | Beluse |
| 2017/0302888 A1* | 10/2017 | Mehrholz ............ H02J 9/062 |

OTHER PUBLICATIONS

European Search Report; Application No. 18155612.7-1219; dated Apr. 5, 2018.

* cited by examiner

*Primary Examiner* — Daniel J Cavallari
(74) *Attorney, Agent, or Firm* — Duft & Bornsen, PC

(57) ABSTRACT

Embodiments described herein provide systems and methods for securing electrical power and/or data communications between a ground system and an aircraft by monitoring characteristics of the electrical power and/or the data communications from the ground system. The ground system may be prevented from providing electrical power and/or data communications to the aircraft when the characteristics are different than expected.

26 Claims, 7 Drawing Sheets

SECURED POWER AND DATA COMMUNICATIONS FOR AIRCRAFT COUPLED TO GROUND SYSTEMS

FIELD

This disclosure relates to the field of aircraft support, and in particular, to securing power and/or data communications received by an aircraft from a ground system.

BACKGROUND

Modern passenger aircraft may have significant power and communication requirements while on the ground, which is handled by a ground system that includes power and in some cases data communications cables that are removably coupled to the aircraft. The ground system provides electrical power to the aircraft while the aircraft engines are powered down. The ground system also provides communication capabilities between a data network at the airport and an onboard data network of the aircraft.

Often, the ground system power cables are heavy and difficult to manipulate and connect to the aircraft due to the size of the cable that is needed to support the high-power requirements of modern aircraft. In addition, ground system communication cables that connect the ground system to the aircraft are not common, and when available they are separate cables that are subject to damage.

In some cases, communications from the ground system may be used to interface with various data networks onboard the aircraft. For example, the ground system may be used to update the software on avionic systems onboard the aircraft that control the operation of the aircraft. This may pose a security threat in some cases. For example, hacking the avionics onboard the aircraft using an unauthorized ground system may put passengers onboard the aircraft at risk during flight operations. In addition, providing power to the aircraft using an unauthorized ground system may cause damage to the power systems onboard the aircraft, which may also put the passengers at risk during flight operations. It is therefore desirable to provide security for power and/or data communications provided by a ground system to the aircraft.

SUMMARY

Embodiments described herein provide systems and methods for securing electrical power and/or data communications between a ground system and an aircraft by monitoring characteristics of the electrical power and/or the data communications from the ground system. The ground system may be prevented from providing electrical power and/or data communications to the aircraft when the characteristics are different than expected.

One embodiment comprises an apparatus that includes a power connector, a power sensor, and a controller. The power connector is disposed along an outer surface of a fuselage of an aircraft and electrically couples electrical power received from a ground system to an onboard power bus of the aircraft. The power sensor is electrically coupled to the power connector and measures an electrical characteristic of the electrical power received from the ground system. The controller receives measurements of the electrical characteristic from the power sensor, and prevents the ground system from electrically coupling with the onboard power bus in response to the electrical characteristic being different than an electrical target value by a first threshold amount.

Another embodiment comprises a method for securing electrical power provided by a ground system to an aircraft in an exemplary embodiment. The method comprises receiving electrical power from a ground system by a power connector disposed along an outer surface of a fuselage of an aircraft that is electrically couplable to an onboard power bus of the aircraft. The method further comprises measuring an electrical characteristic of the electrical power received from the ground system, and preventing the ground system from electrically coupling with the onboard power bus in response to the electrical characteristic being different than an electrical target value by a first threshold amount.

Another embodiment comprises an apparatus that includes a data connector, a data sensor, and a controller. The data connector is disposed along an outer surface of a fuselage of an aircraft and communicatively couples data communications received from a ground system to an onboard data network of the aircraft. The data sensor is communicatively coupled to the data connector and measures a communication characteristic of the data communications received from the ground system. The controller receives measurements of the communication characteristic from the data sensor, and prevents the ground system from communicatively coupling with the onboard data network in response to the communication characteristic being different than a data target value by a first threshold amount.

Another embodiment comprises a method for securing data communications received by an aircraft from a ground system in an exemplary embodiment. The method comprises receiving data communications from a ground system by a data connector disposed along an outer surface of a fuselage of an aircraft that is communicatively couplable to an onboard data network. The method further comprises measuring a communication characteristic of the data communications received from the ground system, and preventing the ground system from communicatively coupling with the onboard data network in response to the communication characteristic being different than a data target value by a first threshold amount.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
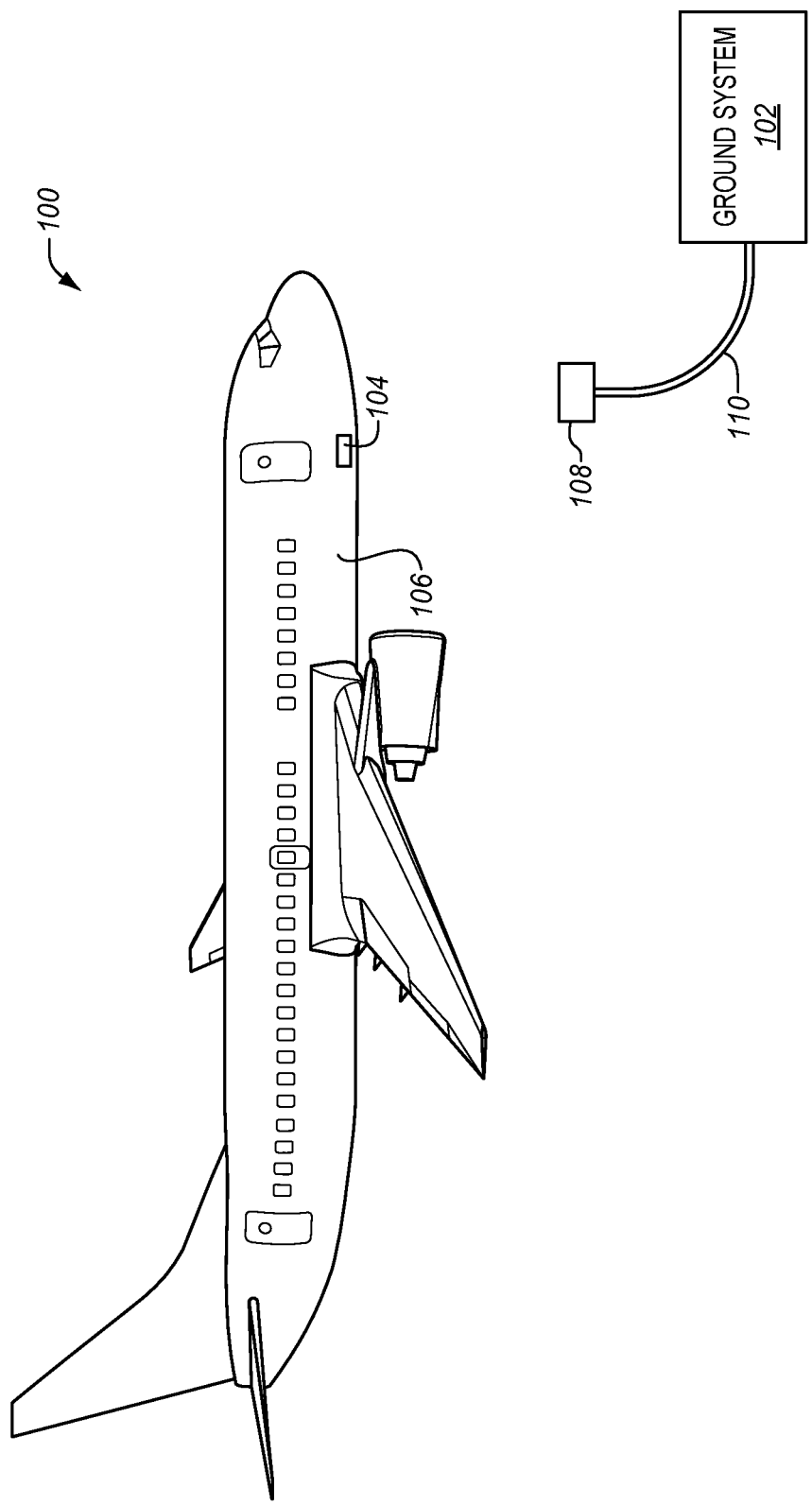
FIG. 1 illustrates an aircraft and a ground system in an exemplary embodiment.

FIG. 1 illustrates an aircraft 100 and a ground system 102 in an exemplary embodiment. Although aircraft 100 is illustrated as a passenger jet in FIG. 1, aircraft 100 may include any air vehicle that utilizes a ground support system (e.g., ground system 102) as a matter of design choice. Ground system 102 in this embodiment is able to provide electrical power and/or data communication services for aircraft 100 while on the ground (e.g., aircraft 100 is parked at a gate of an airport). Typically, the engines of aircraft 100 are powered down when aircraft 100 is parked at the gate, which reduces or eliminates the electrical power generated by aircraft 100. However, aircraft 100 continues to have electrical demands that can be provided by ground system 102. To support the electrical demands of aircraft 100, ground system 102 is connected to an aircraft connector 104. Aircraft connector 104 is located on an exterior surface of a fuselage 106 of aircraft 100 and is accessible by a ground crew using ground system 102. For instance, aircraft connector 104 may be located in an access bay that is set into fuselage 106. Electrical power and/or data communications are provided by ground system 102 by connecting a ground system connector 108 that is located at one end of a cable 110 to aircraft connector 104.

Cable 110 of ground system 102 may comprise any type of conductor that is able to transfer electrical power and/or data communications between ground system 102 and aircraft 100. In some embodiments, cable 110 is formed from carbon nanotubes, which are allotropes of carbon with a cylindrical nanostructure. The cylindrical carbon nanotubes have exemplary electrical properties, which may allow cable 110 to carry a large amount of current without the use of heavy, bulky, electrical cables. The cylindrical carbon nanotubes also facilitate the transmission of photons within an interior of the cylinders of carbon. This may allow for a single cable that is capable of providing a large electrical current while simultaneously allowing for a high data transmission rate between ground system 102 and aircraft 100. The use of carbon nanotubes for the fabrication of cable 110 may be utilized to reduce the weight of cable 110, while also eliminating the use of a separate data communication cable between ground system 102 and aircraft 100.

Aircraft connector 104 may comprise any type of component, device, or interface that is able to transport electrical power and/or data communications between ground system 102 and aircraft 100. For instance, aircraft connector 104 may include a separate electrical power connector and data communication connector. In addition, or instead of, aircraft connector 104 may utilize an integrated electrical power and data communication connector in some embodiments, which allows for the use of fewer cables between ground system 102 and aircraft 100.

Figure 2:
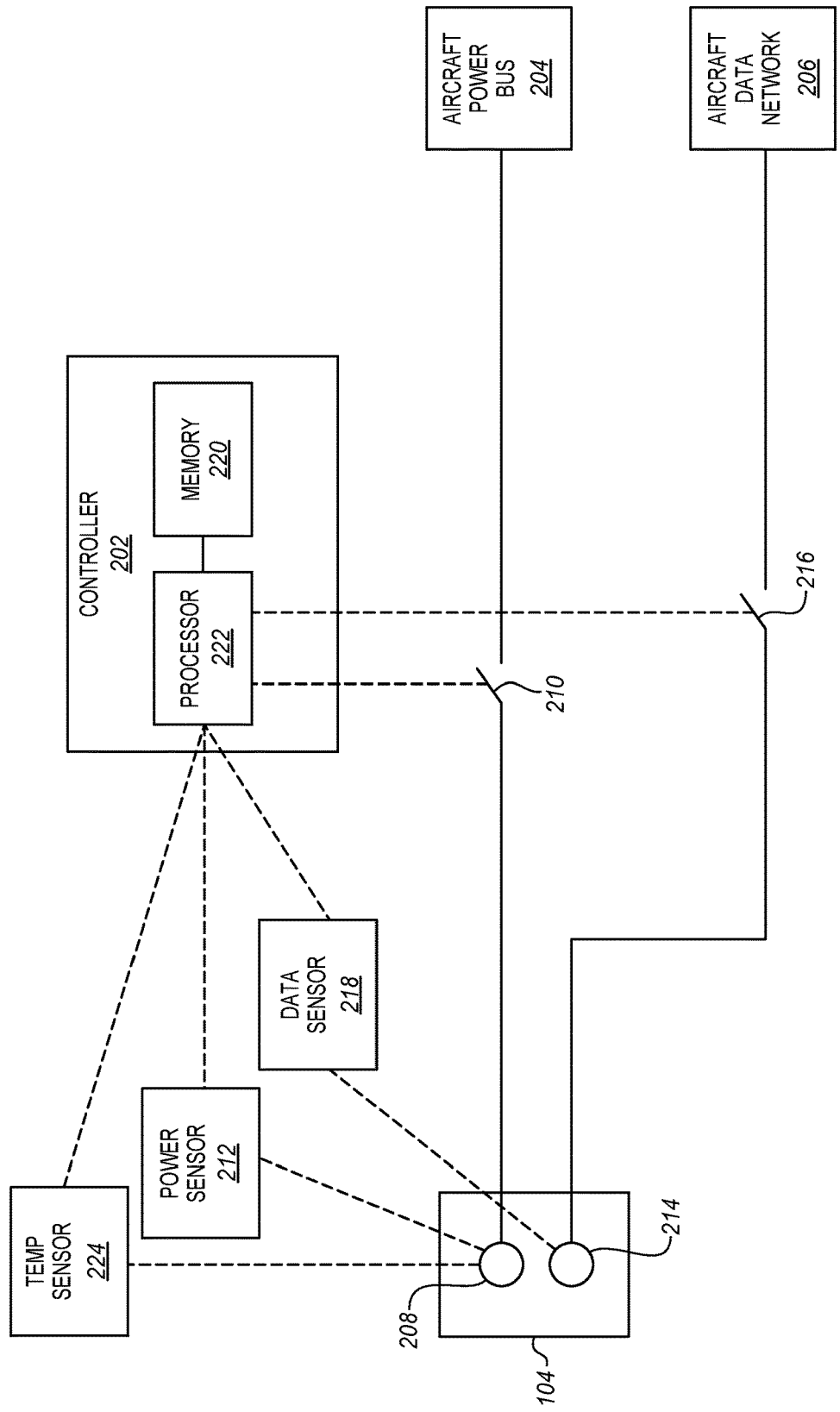
FIG. 2 illustrates a system on the aircraft of FIG. 1 that that secures electrical power and/or data communications received from the ground system of FIG. 1 in an exemplary embodiment.

FIG. 2 illustrates a system 200 on aircraft 100 that secures electrical power and/or data communications received from ground system 102 in an exemplary embodiment. In this embodiment, system 200 includes a controller 202 that makes a determination whether ground system 102 is allowed to provide electrical power and/or data communications to aircraft 100.

In some cases, aircraft 100 may be damaged if the electrical power supplied to aircraft 100 does not meet specifications for aircraft 100. For instance, aircraft 100 may be designed to utilize a 400 Hertz 3-phase 115 Volt (V) Root Mean Square (RMS) electrical power, which may not be supplied correctly from ground system 102 in some cases. For instance, the electrical power supplied by ground system 102 may have a voltage that is too high or too low, may have a frequency that is too high or too low, and/or may have a different phase than what aircraft 100 is designed to accept. System 200 illustrated in FIG. 2 is able to monitor the electrical characteristics of the electrical power supplied by ground system 102, and make a determination whether to electrically couple the electrical power supplied by ground system 102 to an aircraft power bus 204. Instead of, or in addition to, system 200 illustrated in FIG. 2 may also be able to monitor the communication characteristics of the data communications received from ground system 102, and make a determination whether to communicatively couple the data communications received from ground system 102 to an aircraft data network 206.

In FIG. 2, electrical power supplied to aircraft connector 104 by ground system 102 is received by aircraft 100 at a power connector 208. Power connector 208 comprises any component, system, or device that is able to receive electrical power from ground system 102. Although only one power connector 208 is illustrated in FIG. 2, multiple power connectors 208 may be implemented (e.g., one or more power connectors 208 for each phase, one or more power connectors 208 for a neutral line, and/or one or more power connectors 208 for ground).

Electrical power supplied by ground system 102 may be removably connected to aircraft power bus 204 utilizing a power transfer switch 210. Power transfer switch 210 may include solid state relays, electronic relays, etc., as a matter of design choice. Power transfer switch 210 comprises any component, system, or device that is able to controllably couple and decouple power connector 208 with aircraft power bus 204. In FIG. 2, power transfer switch 210 is illustrated as directly coupling power connector 208 with aircraft power bus 204, although a manual switch located in a cockpit of aircraft 100 may be used to ensure that a person makes the final determination regarding if or when electrical power supplied by ground system 102 is electrically coupled with aircraft power bus 204. This manual switch may be in line between power connector 208 and aircraft power bus 204, and may be illuminated when power transfer switch 210 is closed, thereby indicating to the person in the cockpit that the electrical power supplied by ground system 102 satisfies one or more electrical characteristics. Controller 202 is able to monitor various electrical characteristics for the electrical power supplied to power connector 208 by ground system 102 using a power sensor 212 and/or a temperature sensor 224. Power sensor 212 may measure a voltage supplied to power connector 208 by ground system 102, a phase across one or more power connectors 208 supplied by ground system 102, a frequency of the electrical power supplied to power connector 208 by ground system 102, a current supplied by ground system 102, etc. Power sensor 212 therefore comprises any component, system, or device that is able to detect or sense information about the electrical characteristics of the electrical power supplied by ground system 102 to power connector 208. Temp sensor 224 may measure a temperature at power connector 208, which may be used by controller 202 to determine a temperature differential between ambient and power connector 208 that may suggest impedance information about cable 110. Temp sensor 224 may therefore comprise any component, system, or device that is able to detect or sense information about the temperature at power connector 208. Controller 202 uses information provided by power sensor 212 and/or temp sensor 224 to make a determination whether the electrical power supplied by ground system 102 will be electrically coupled with aircraft power bus 204.

In FIG. 2, data communications supplied to aircraft connector 104 by ground system 102 is received by aircraft 100 at a data connector 214. In some embodiments, data connector 214 is present in addition to power connector 208. In other embodiments, data connector 214 is present instead of power connector 208. Data connector 214 comprises any component, system, or device that is able to receive data communications from ground system 102. Although only one data connector 214 is illustrated in FIG. 2, multiple data connectors 214 may be implemented (e.g., one or more data connectors 214 for multiple data channels to improve the data throughput between ground system 102 and aircraft data network 206).

One problem that may occur with data communications from ground system 102 is an attempt to hack into aircraft data network 206. A hacker may try to gain access to aircraft data network 206 to install or modify software that controls aircraft 100. For instance, a hacker may try to modify the flight control software of aircraft 100, which may put passengers that are on aircraft 100 at risk during flight operations. Controller 202 operates to ensure the security of aircraft data network 206 by analyzing the data communications received from ground system 102.

Data communications received by ground system 102 at data connector 214 may be removably connected to aircraft data network 206 utilizing a data transfer switch 216. Data transfer switch 216 may include solid state relays, electronic relays, routers, switches, etc., as a matter of design choice. Data transfer switch 216 comprises any component, system, or device that is able to controllably couple and decouple data connector 214 with aircraft data network 206. In FIG. 2, data transfer switch 216 is illustrated as directly coupling data connector 214 with aircraft data network 206, although a manual switch located in a cockpit of aircraft 100 may be used to ensure that a person makes the final determination regarding if or when data communications supplied by ground system 102 are communicatively coupled with aircraft data network 206. This manual switch may be in line between data connector 214 and aircraft data network 206, and may be illuminated when data transfer switch 216 is closed, thereby indicating to the person in the cockpit that the data communications supplied by ground system 102 satisfies one or more communication characteristics. Controller 202 is able to monitor communication characteristics for the data communications received by data connector 214 from ground system 102 using a data sensor 218. Data sensor 218 may measure a data rate of the data communications provided to data connector 214 by ground system 102, analyze headers associated with the data communications, infer what subsystems in aircraft data network 206 are targeted by the data communications, etc. Data sensor 218 therefore comprises any component, system, or device that is able to detect or sense information about the communication characteristics of the data communications received by ground system 102 at data connector 214. Controller 202 uses this information to make a determination whether the data communications from ground system 102 will be communicatively coupled with aircraft data network 206. Controller 202 is able to couple or decouple data communications from ground system 102 with aircraft data network 206 using data transfer switch 216. In some embodiments, controller 202 may buffer the data communications received from ground system 102 (e.g., using a memory 220 of controller 202), and forward the data communications to aircraft data network 206 if certain communication characteristics are satisfied.

While the specific hardware implementation of controller 202 is subject to design choices, one particular embodiment may include one or more processors 222 communicatively coupled with memory 220. Processor 222 includes any electronic circuits and/or optical circuits that are able to perform functions. For example, processor 222 may perform any functionality described herein for controller 202. Processor 222 may include one or more Central Processing Units (CPU), microprocessors, Digital Signal Processors (DSPs), Application-specific Integrated Circuits (ASICs), Programmable Logic Devices (PLD), control circuitry, etc. Some examples of processors include INTEL® CORE™ processors, Advanced Reduced Instruction Set Computing (RISC) Machines (ARM®) processors, etc.

Memory 220 includes any electronic circuits, and/or optical circuits, and/or magnetic circuits that are able to store data. For instance, memory 220 may be used to store or buffer data communications received from ground system 102, which may then be analyzed by processor 222 prior to either forwarding the data communications to aircraft data network 206 if certain communication characteristics are satisfied, or discarding the data communications if certain communication characteristics are not satisfied. Memory 220 may also store instructions that execute on processor 222. Memory 220 may include one or more volatile or non-volatile Dynamic Random Access Memory (DRAM) devices, FLASH devices, volatile or non-volatile Static RAM devices, magnetic disk drives, Solid State Disks (SSDs), etc. Some examples of non-volatile DRAM and SRAM include battery-backed DRAM and battery-backed SRAM.

Assume that aircraft 100 is on the ground and that ground system 102 is removably coupled to aircraft 100 (e.g., using cable 110 and ground system connector 108). Also assume that power transfer switch 210 and power transfer switch 210 are in a state (e.g., open) that prevents ground system 102 from supplying electrical power to aircraft power bus 204 and/or providing data communications to aircraft data network 206.

Figure 3:
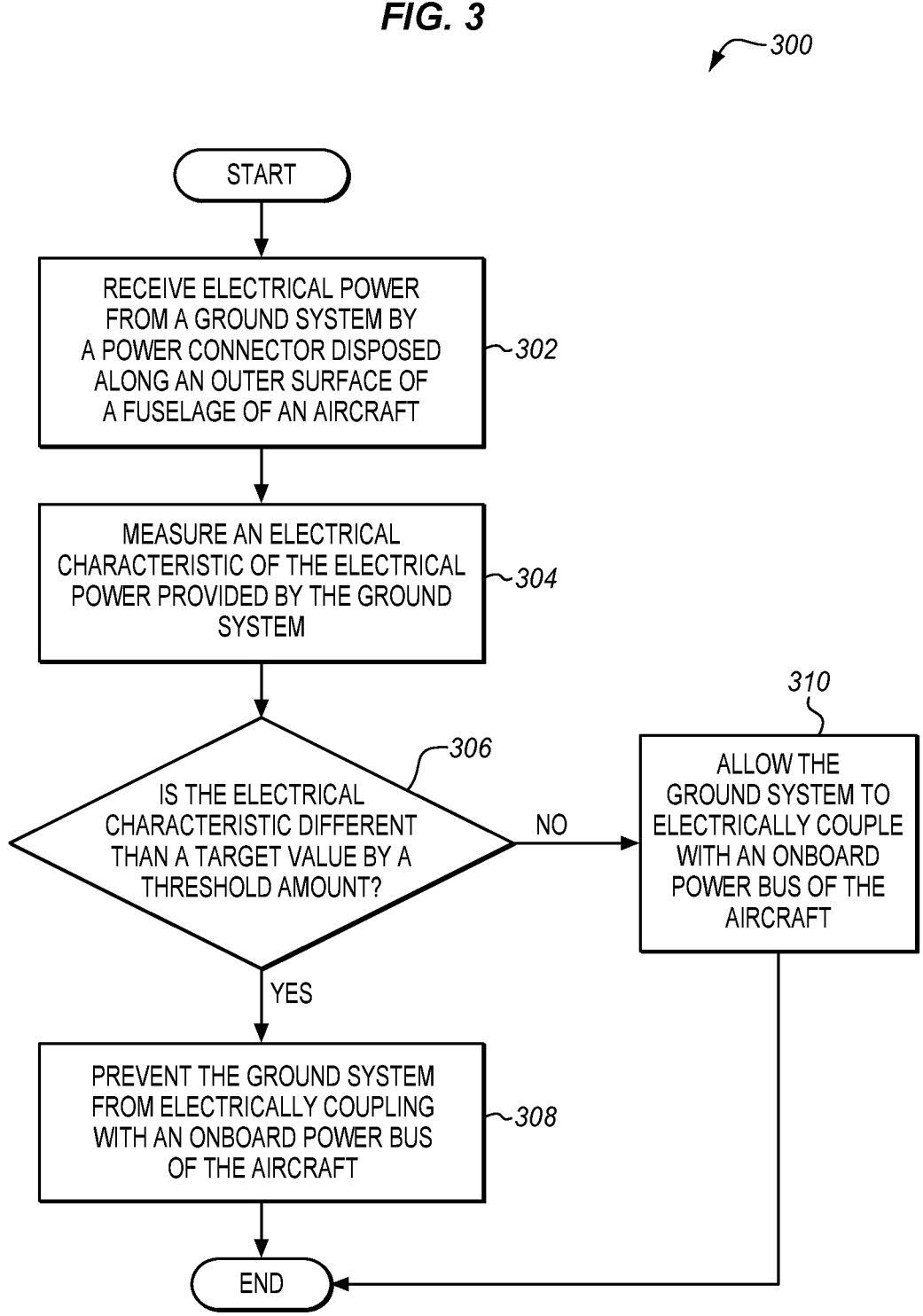
FIG. 3 is a flow chart of a method for securing electrical power provided to an aircraft from a ground system in an exemplary embodiment.

FIG. 3 is a flow chart of a method 300 for securing the electrical power provided to aircraft 100 from ground system 102 in an exemplary embodiment. The methods disclosed herein will be discussed with respect to system 200, aircraft 100, and ground system 102, although the methods may be performed by other systems, not shown. The methods may include other steps, not shown. Also, the steps may be performed in an alternate order.

When ground system connector 108 on cable 110 is connected to aircraft connector 104, electrical power is received at power connector 208 from ground system 102 (see step 302). The electrical power may be any voltage, phase, or frequency, which are considered as some of the possible electrical characteristics associated with the electrical power provided by ground system 102 to aircraft 100. Power sensor 212 detects the electrical characteristics, which are measured by processor 222 (see step 304). For instance, power sensor 212 may detect the phase, and/or the voltage and/or the frequency of the electrical power provided by ground system 102 to aircraft 100. However, one of ordinary skill in the art will recognize that any electrical characteristic may be measured and be part of a determination of whether the electrical power provided by ground system 102 will be electrically coupled to aircraft power bus 204.

Processor 222 analyzes the measurements of the electrical characteristics sensed by power sensor 212, and determines whether to allow ground system 102 to electrically couple to aircraft power bus 204 (see step 306). In particular, processor 222 determines whether the electrical characteristics are different than a target value by a threshold amount. For instance, processor 222 may utilize power sensor 212 to measure a frequency of the electrical power provided by ground system 102 to aircraft 100, and determine if the frequency is 400 Hertz+/− a threshold amount (e.g., the frequency is within 5% of a target frequency of 400 Hertz). For a voltage measurement, processor 222 may utilize power sensor 212 to measure a voltage of the electrical power provided by ground system 102 to aircraft 100, and determine if the voltage is 115 Volts RMS+/− a threshold amount (e.g., the voltage is within 5% of a target voltage of 115 V RMS). For a phase measurement, processor 222 may utilize power sensor 212 to measure a phase of the electrical power provided by ground system 102 to aircraft 100 (e.g., across a plurality of power connectors 208), and determine if the phase is 3-phase power. Although particular electrical characteristics, target values, and threshold amounts have been discussed, one of ordinary skill in the art will recognize that any electrical characteristic, target value, and threshold amount may be used as a matter of design choice.

If processor 222 determines that the electrical characteristic is different than the target value, or an expected value, or a desired value (within some threshold amount), then processor 222 prevents ground system 102 from electrically coupling with aircraft power bus 204 (see step 308). For instance, processor 222 may hold power transfer switch 210 open. However, if processor 222 determines that the electrical characteristic is instead within a threshold amount of the target value, then processor 222 allows ground system 102 to electrically couple with aircraft power bus 204 (e.g., by closing power transfer switch 210, see step 310). However, a manual operator may still be part of the process using controls or button(s) located in the cockpit of aircraft 100, as discussed previously.

Figure 4:
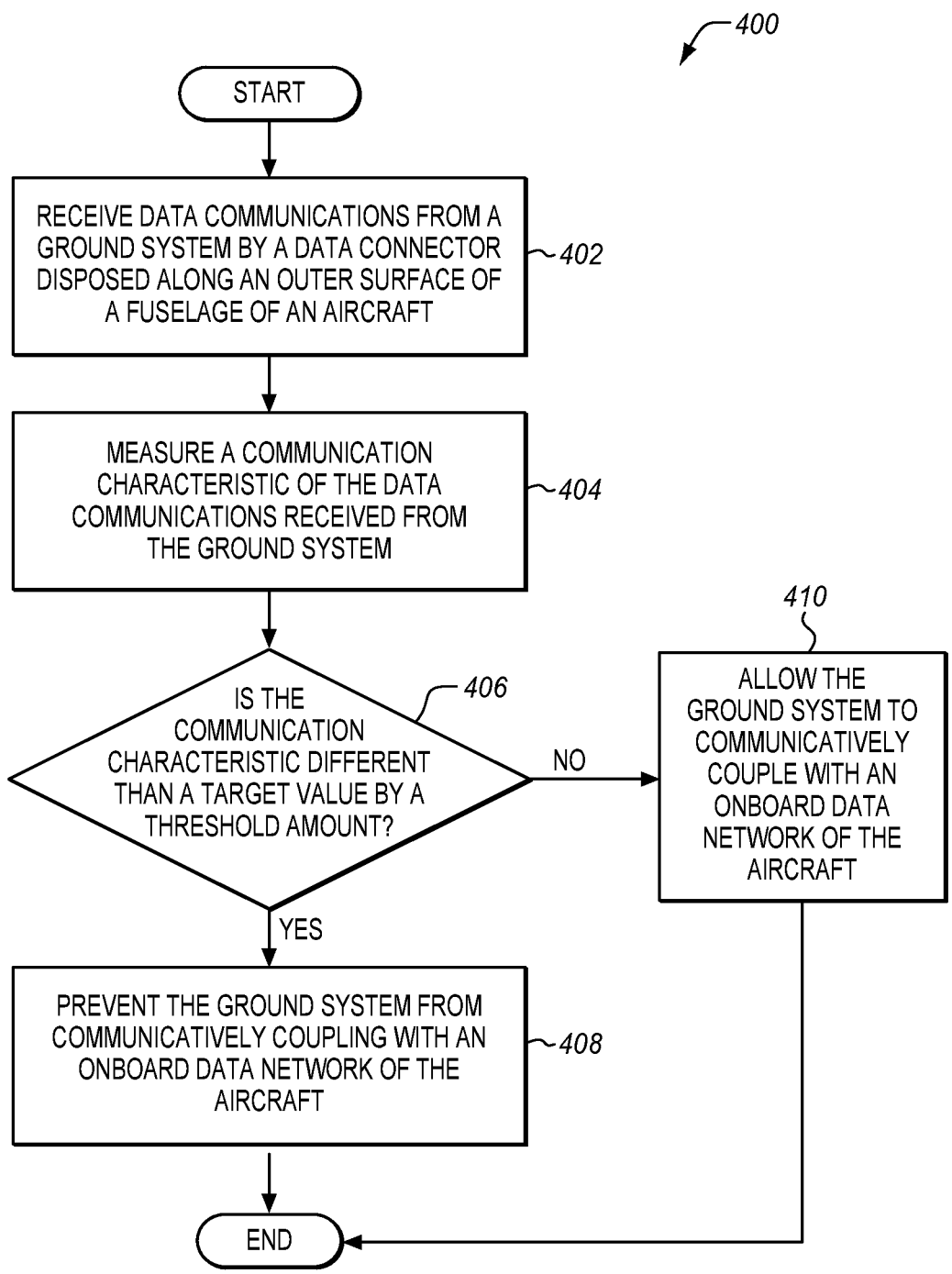
FIG. 4 is a flow chart of a method for securing data communications provided to an aircraft from a ground system in an exemplary embodiment.

FIG. 4 is a flow chart of a method 400 for securing the data communications provided to aircraft 100 by ground system 102 in an exemplary embodiment. When ground system connector 108 on cable 110 is connected to aircraft connector 104, data communications are received at data connector 214 from ground system 102 (see step 402). The data communications may comprise any data rate, signaling protocol, etc., which are considered as some of the possible communication characteristics associated with the data communications received from ground system 102 by aircraft 100. Data sensor 218 detects the communication characteristics, which are measured by processor 222 (see step 404). For instance, data sensor 218 may detect the signaling protocol, the data rate, the types of packet headers associated with the data communications, and/or what specific aircraft domain is targeted by the data communications (e.g., by analyzing the headers associated with the data communications).

Processor 222 analyzes the measurements of the communication characteristics sensed by data sensor 218, and determines whether to allow ground system 102 to communicatively couple with aircraft data network 206. In particular, processor 222 determines whether the communication characteristics are different than a target value by a threshold amount (see step 406). For instance, processor 222 may utilize data sensor 218 to measure a data rate of the data communications provided by ground system 102 to aircraft 100, and determine if the data rate is different than a target data rate (within a threshold amount). If the target data rate is 1 Gigabits per second (Gbps), then processor 222 may determine whether the measured data rate is 1 Gbps+/− a threshold amount (e.g., 15%).

If processor 222 determines that the communication characteristic is different than the target value, or an expected value, or a desired value (within some threshold amount), then processor 222 prevents ground system 102 from communicatively coupling with aircraft data network 206 (see step 408). For instance, processor 222 may hold data transfer switch 216 open. However, if processor 222 determines that the communication characteristic is instead within a threshold amount of the target value, then processor 222 allows ground system 102 to communicatively couple with aircraft data network 206 (e.g., by closing data transfer switch 216, see step 410). Although particular communication characteristics, target values, and threshold amounts have been discussed, one of ordinary skill in the art will recognize that any communication characteristic, target value, and threshold amount may be used as a matter of design choice.

Figure 5:
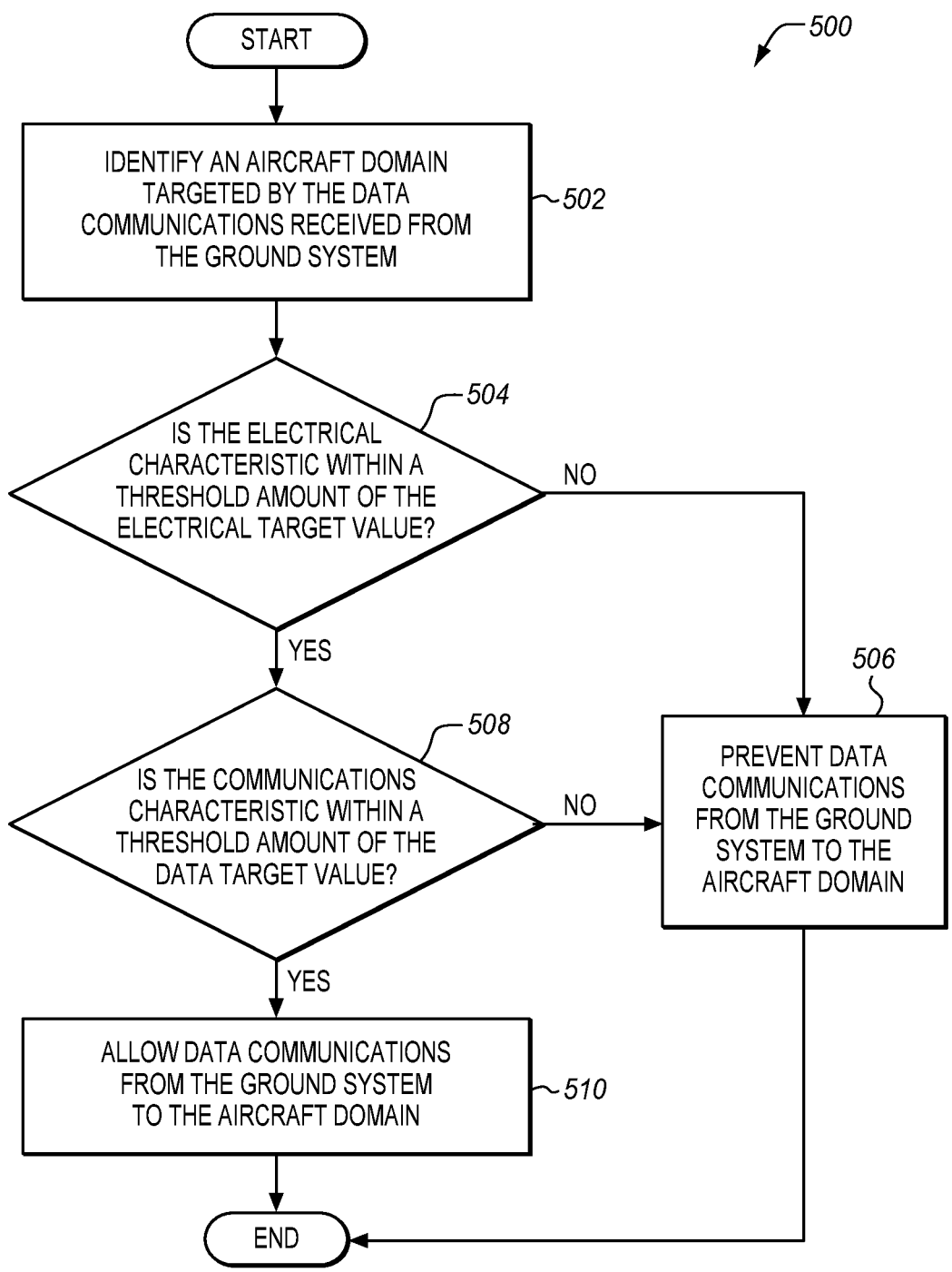
FIG. 5 is a flow chart of a method of securing domain access to an aircraft data network in an exemplary embodiment.

FIG. 5 is a flow chart of a method 500 of securing domain access to an aircraft data network in an exemplary embodiment. In method 500, both the electrical characteristics of the electrical power provided to aircraft 100 by ground system 102 and the communication characteristics of the data communications received from ground system 102 are used to determine if ground system 102 is allowed to communicate with a particular aircraft domain within aircraft data network 206. An aircraft domain (or an aircraft information domain) is a model which segments network elements in aircraft data network 206 into different safety and security domains. One domain in the model is the Aircraft Control (AC) domain, which consists of systems and networks within aircraft data network 206 that support the safe operation of aircraft 100. For example, a jet engine control module on aircraft 100 may be part of the AC domain, with updates to the control software from non-authorized parties being regulated by preventing ground system 102 from accessing the AC domain on aircraft 100 unless certain electrical and communication characteristics are satisfied. The AC domain may be divided into two sub-domains, a flight and embedded control system sub-domain, and a cabin core sub-domain. The flight and embedded control sub-domain relates to flight deck control of aircraft 100, while the cabin core sub-domain relates to environmental functions dedicated to cabin operations, which includes environmental control, passenger address paging, smoke detection, etc.

Another domain in the model is the Airline Information Services (AIS) domain, which provides general purpose routing, data storage, and communications services for non-essential applications. The AIS domain may provide services and connectivity between independent aircraft domains such as avionics, in-flight entertainment, etc. The AIS domain may be used to support applications and content for cabin or flight crew use. The AIS domain may be divided into two sub-domains, an administrative sub-domain and a passenger support sub-domain. The administrative sub-domain provides operational and airline administrative information to the flight deck and the crew, while the passenger support sub-domain provides information to support the passengers.

Another domain in the model is the Passenger Information and Entertainment Services (PIES) domain. The purpose of the PIES domain is to provide passengers on aircraft 100 with entertainment and network services. The PIES domain may include more than the traditional In Flight Entertainment (IFE) systems, such as devices or functions that provides services to passengers. PIES domain may also include passenger flight information systems (PFIS), television services, Internet connectivity services, etc.

Another domain in the model is the Passenger Owned Devices (POD) domain. The POD domain is defined to include the devices that passengers may bring on aircraft 100. The devices may connect to aircraft data network 206, or to one another (peer-to-peer). The POD domain connectivity to aircraft data network 206 is provided by the PIES domain.

When receiving data communications from ground system 102, processor 222 identifies an aircraft domain targeted by the data communications (see step 502). For instance, processor 222 may identify that the data communications received from ground system 102 that target the AC domain. To do so, processor 222 may analyze the headers associated with the data communications, may identify routing information in the data communications, may identify the content of the data communications, etc. Processor 222 then determines if the electrical characteristic of the electrical power provided to aircraft 100 by ground system 102 are within a threshold amount of a target value (see step 504). For example, processor 222 may determine that the frequency of the electrical power provided by ground system 102 is within a range of 400 hertz+/−10 hertz. If the electrical characteristic is not within a threshold amount of the target value, then controller 202 prevents data communications from ground system 102 to the aircraft domain (see step 506). However, if the electrical characteristic is within a threshold amount of the target value (e.g., the frequency is 401 hertz), then step 508 is performed. Controller 202 determines in step 508 if the communication characteristic of the data communications received from ground system 102 is within a threshold amount of a target value. For example, processor 222 may determine that the data rate of the data communications received from ground system 102 is within a range of 1 GBPS+/−100 kilobits per second (Kbps). If the communication characteristic is not within a threshold amount of the target value, then controller 202 prevents data communications from ground system 102 to the aircraft domain (see step 506). However, if the communication characteristic is within a threshold amount of the target value (e.g., the data rate is 1 GBPS+/−10 Kbps), then processor 222 allows the data communications from ground system 102 to the aircraft domain (see step 510). For example, processor 222 may allow ground system 102 to communicate with the AC domain by closing data transfer switch 216.

Figure 6:
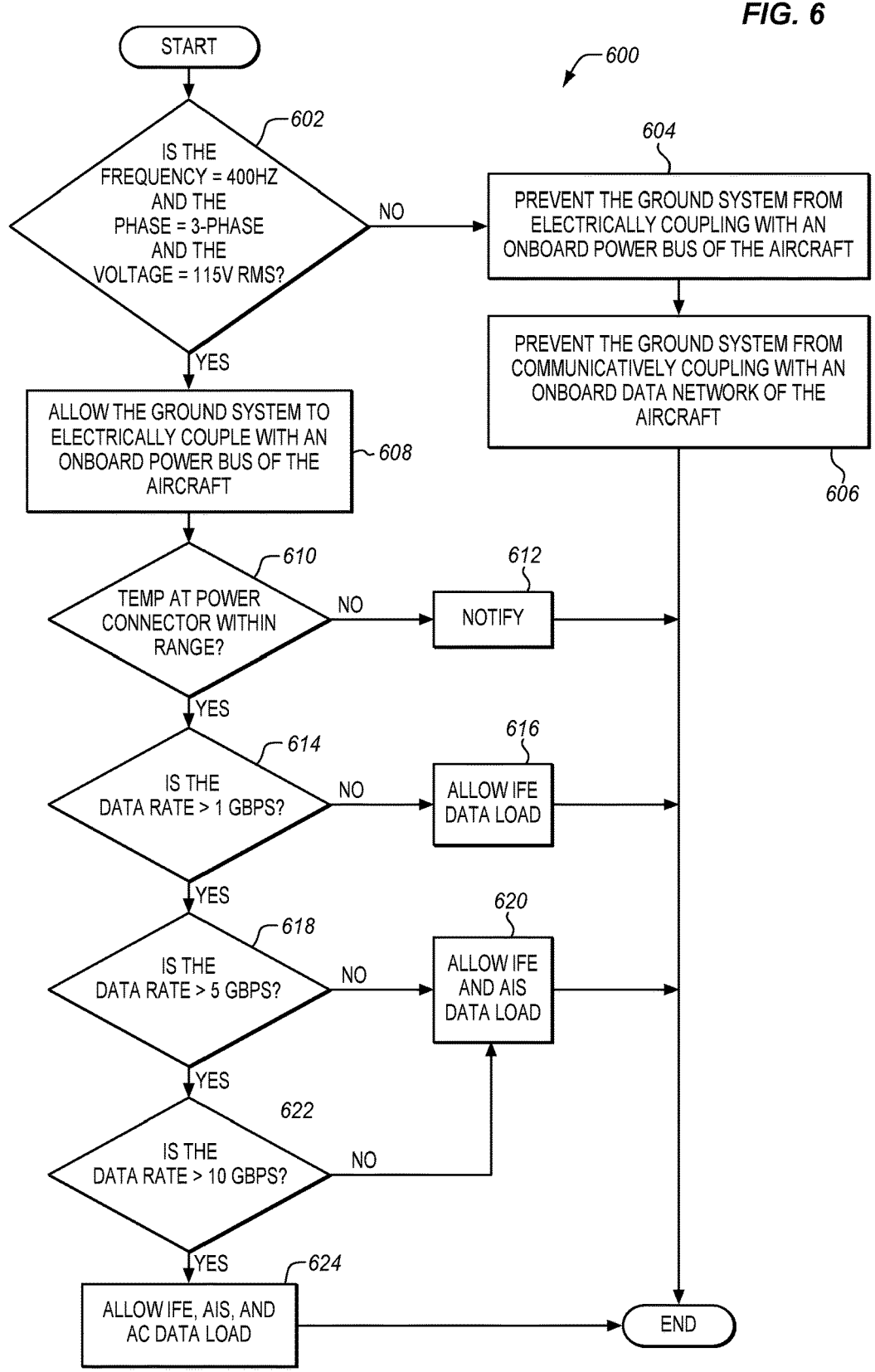
FIG. 6 is a flow chart of a method for securing data uploads provided to an aircraft from a ground system in an exemplary embodiment.

FIG. 6 is a flow chart of a method 600 for securing data uploads provided to aircraft 100 from ground system 102 in an exemplary embodiment. Method 600 illustrates that various levels of security may be implemented using both the electrical characteristics of the electrical power provided to aircraft 100, the communication characteristics of the data communications received by aircraft 100, and the temperature characteristics at the electrical connection at aircraft. In particular, method 600 illustrates how different aircraft domains may be accessed based on the electrical characteristics and the communication characteristics.

Method 600 begins by processor 222 determining if the electrical power received from ground system 102 satisfies all of the following electrical characteristics: the frequency is 400 hertz, the phase is 3-phase, and the voltage is 115 V RMS (see step 602). If any of these conditions are not true (within various threshold amounts), then processor 222 prevents ground system 102 from electrically coupling with aircraft power bus 204 (see step 604). For instance, processor 222 does not close power transfer switch 210. Processor 222 also prevents ground system 102 from communicatively coupling with aircraft data network 206 (see step 606). For instance, processor 222 does not close data transfer switch 216. However, if all of these conditions are satisfied (within various threshold amounts), then processor 222 allows ground system 102 to electrically couple to aircraft power bus 204 (see step 608). For instance, processor 222 closes power transfer switch 210.

Processor 222 then determines if the temperature at power connector 208 is within an expected using temp sensor 224 (see step 610). In some cases, a high temperature at power connector 208 as compared to ambient temperature may indicate that cable 110 has a higher resistance than what is expected. For instance, processor 222 may measure the current supplied by cable 110 (e.g., using power sensor 212), the temperature at power connector 208 (e.g., using temp sensor 224), and the ambient temperature to calculate a temperature characteristic of cable 110. A high temperature rise over ambient at power connector 208 may indicate that cable 110 has a higher impedance than expected, which causes power connector 208 to heat more than expected. If cable 110 has a higher impedance than expected, then this may indicate that the construction of cable 110 is different than expected, indicating a possible security problem. Processor 222 may provide a notification to a remote party (e.g., an airline security service) indicating that the temperature at power connector 208 is outside of an expect range (see step 612).

Processor 222 then determines if the data rate is greater than 1 Gbps (see step 614). If the data rate is greater than 1 Gbps, then processor 222 allows data to be loaded from ground system 102 to the IFE domain of aircraft data network 206 (see step 616). Processor 222 then determines if the data rate is greater than 5 Gbps (see step 618). If the data rate is greater than 5 Gbps, then processor 222 allows data to be loaded from ground system 102 to both the IFE systems and the AIS domain in aircraft data network 206 (see step 620), which is a higher risk than loading data to the IFE systems alone. Processor 222 then determines if the data rate is greater than 10 Gbps (see step 622). If the data rate is greater than 10 Gbps, then processor 222 allows data to be loaded from ground system 102 to the IFE systems, the AIS domain, and the AC domain (see step 624), which is a higher risk than loading data to the IFE systems or to the AIS domain. Otherwise, step 620 is performed.

Figure 7:
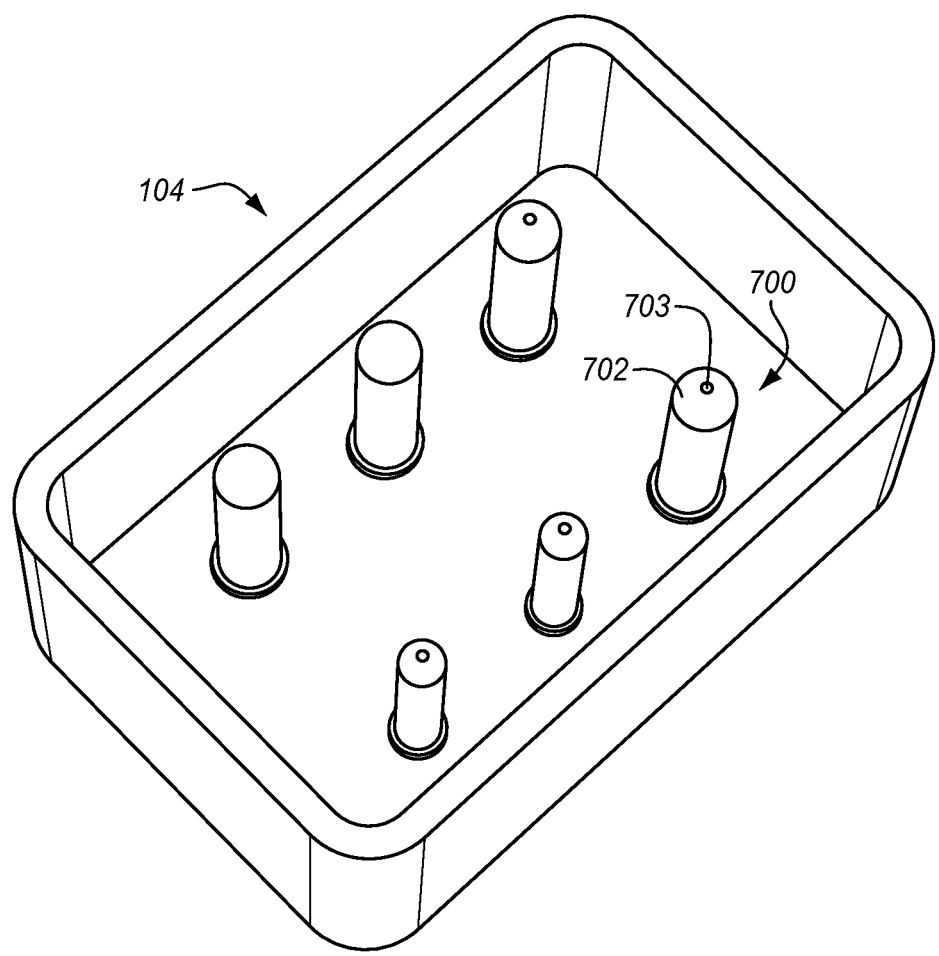
FIG. 7 illustrates the aircraft connector of FIG. 1 in an exemplary embodiment.

Although the design and implementation of aircraft connector 104 is a matter of design choice, one exemplary embodiment of aircraft connector 104 is illustrated in FIG. 7. In this embodiment, aircraft connector 104 comprises a plurality of pins 700, which are used to receive both electrical power and data communications from ground system 102. In this embodiment, ground system connector 108 is configured to mate with the aircraft connector 104 illustrated in FIG. 7. Some of pins 700 include both an outer conductive portion 702 and an inner communications portion 703. Outer conductive portion 702 receives electrical power from ground system 102, and inner communications portion 703 receives data communications from ground system 102. Inner communications portion 703 may comprise an optical fiber that receives data communications from ground system 102. Some of pins 700 may include both capabilities, while other pins 700 may be used to carry electrical power only. The number of pins 700 is a matter of design choice, although in this embodiment the four longer pins 700 in FIG. 7 carry different phases of 3-phase AC, along with a neutral. The shorter of pins 700 are ground pins for data communications.

The various embodiments described provide for securing the electrical power and/or the data communications received by an aircraft (e.g., aircraft 100) by a ground system (e.g., ground system 102). Securing the electrical power reduces the possibility of damage to aircraft (e.g., due to electrical power incompatibilities), which may put passengers at risk during flight operations. Securing the data communications reduces the possibility of an adversary hacking into the data network onboard the aircraft, which also may put passengers at risk during flight operations.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" may implicitly include, without limitation, digital signal processor (DSP) hardware, a network processor hardware, application specific integrated circuit (ASIC) hardware or other hardware circuitry, field programmable gate array (FPGA) hardware, or some other physical hardware component.

Also, the functionality described herein may be implemented as instructions executable by a processor or a computer to perform the functions. Some examples of instructions are software, program code, and firmware. The instructions are operational when executed by the processor to direct the processor to perform the functions. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

What is claimed is:

1. An apparatus comprising:
a power connector disposed along an outer surface of a fuselage of an aircraft that is configured to electrically couple electrical power received from a ground system to an onboard power bus of the aircraft;
a power sensor electrically coupled to the power connector that is configured to measure an electrical characteristic of the electrical power applied to the power connector by the ground system; and
a controller that is configured, in response to the electrical power being applied to the power connector, to receive measurements of the electrical characteristic from the power sensor, and to prevent the ground system from electrically coupling with the onboard power bus in response to the electrical characteristic being different than an electrical target value by a first threshold amount.

2. The apparatus of claim 1, wherein the apparatus further comprises:
a data connector disposed along the outer surface of the fuselage that is configured to communicatively couple data communications received from the ground system to an onboard data network of the aircraft; and
a data sensor communicatively coupled to the data connector that is configured to measure a communication characteristic of the data communications received from the ground system,
wherein the controller is configured to receive measurements of the communication characteristic from the data sensor, and to prevent the ground system from communicatively coupling with the onboard data network in response to the communication characteristic being different than a data target value by a second threshold amount.

3. The apparatus of claim 2, wherein the power connector and the data connector comprise:
a pin having an outer conductive portion configured to receive the electrical power from the ground system, and an inner communications portion comprising an optical fiber that is configured to receive the data communications from the ground system.

4. The apparatus of claim 2, wherein:
the controller is configured to determine an aircraft domain targeted by the data communications received from the ground system, and to allow the data communications from the ground system to the aircraft domain in response to the electrical characteristic being within the first threshold amount of the electrical target value and the communication characteristic being within the second threshold amount of the data target value.

5. The apparatus of claim 2, wherein:
the communication characteristic comprises a data rate of the data communications received from the ground system.

6. The apparatus of claim 1, wherein:
the electrical characteristic comprises at least one of a frequency, a phase, and a voltage.

7. The apparatus of claim 6, wherein the electrical target value comprises at least one of:
400 Hertz in response to the electrical characteristic comprising a frequency;
3-phase in response to the electrical characteristic comprising a phase; and
115 Volts Root Mean Square (RMS) in response to the electrical characteristic comprising a voltage.

8. A method comprising:
receiving electrical power from a ground system by a power connector disposed along an outer surface of a fuselage of an aircraft that is electrically couplable to an onboard power bus of the aircraft;
measuring an electrical characteristic of the electrical power received from the ground system; and
preventing the ground system from electrically coupling with the onboard power bus in response to the electrical characteristic being different than an electrical target value by a first threshold amount.

9. The method of claim 8, further comprising:
receiving data communications from the ground system by a data connector disposed along the outer surface of the fuselage that is communicatively couplable to an onboard data network of the aircraft;
measuring a communication characteristic of the data communications received from the ground system; and
preventing the ground system from communicatively coupling with the onboard data network in response to the communication characteristic being different than a data target value by a second threshold amount.

10. The method of claim 9, further comprising:
determining an aircraft domain targeted by the data communications received from the ground system; and
allowing the data communications from the ground system to the aircraft domain in response to the electrical characteristic being within the first threshold amount of the electrical target value and the communication characteristic being within the second threshold amount of the data target value.

11. The method of claim 10, wherein:
the communication characteristic comprises a data rate of the data communications received from the ground system.

12. The method of claim 8, wherein:
the electrical characteristic comprises at least one of a frequency, a phase, and a voltage.

13. The method of claim 12, wherein the electrical target value comprises at least one of:
400 Hertz in response to the electrical characteristic comprising a frequency;
3-phase in response to the electrical characteristic comprising a phase; and
115 Volts Root Mean Square (RMS) in response to the electrical characteristic comprising a voltage.

14. An apparatus comprising:
a data connector disposed along an outer surface of a fuselage of an aircraft that is configured to communicatively couple data communications received from a ground system to an onboard data network of the aircraft;
a data sensor communicatively coupled to the data connector that is configured to measure a communication characteristic of the data communications received from the ground system; and
a controller that is configured to receive measurements of the communication characteristic from the data sensor, and to prevent the ground system from communicatively coupling with the onboard data network in response to the communication characteristic being different than a data target value by first threshold amount.

15. The apparatus of claim 14, further comprising:
a power connector disposed along the outer surface of the fuselage that is configured to electrically couple electrical power received from the ground system to an onboard power bus of the aircraft; and
a power sensor electrically coupled to the power connector that is configured to measure an electrical characteristic of the electrical power received from the ground system,
wherein the controller is configured to receive measurements of the electrical characteristic from the power sensor, and to prevent the ground system from electrically coupling with the onboard power bus in response to the electrical characteristic being different than an electrical target value by a second threshold amount.

16. The apparatus of claim 15, wherein the power connector and the data connector comprise:
a pin having an outer conductive portion configured to receive the electrical power from the ground system, and an inner communications portion comprising an optical fiber that is configured to receive the data communications from the ground system.

17. The apparatus of claim 15, wherein:
the controller is configured to determine an aircraft domain targeted by the data communications received from the ground system, and to allow the data communications from the ground system to the aircraft domain in response to the electrical characteristic being within the second threshold amount the electrical target value and the communication characteristic being within the first threshold amount the data target value.

18. The apparatus of claim 15, wherein:
the electrical characteristic comprises at least one of a frequency, a phase, and a voltage.

19. The apparatus of claim 15, wherein the electrical target value comprises at least one of:
400 Hertz in response to the electrical characteristic comprising a frequency;
3-phase in response to the electrical characteristic comprising a phase; and
115 Volts Root Mean Square (RMS) in response to the electrical characteristic comprising a voltage.

20. The apparatus of claim 14, wherein:
the communication characteristic comprises a data rate of the data communications received from the ground system.

21. A method comprising:
receiving data communications from a ground system by a data connector disposed along an outer surface of a fuselage of an aircraft that is communicatively couplable to an onboard data network of the aircraft;
measuring a communication characteristic of the data communications received from the ground system; and
preventing the ground system from communicatively coupling with the onboard data network in response to the communication characteristic being different than a data target value by a first threshold amount.

22. The method of claim 21, further comprising:
receiving electrical power from the ground system by a power connector disposed along the outer surface of the fuselage that is electrically couplable to an onboard power bus of the aircraft;
measuring an electrical characteristic of the electrical power received from the ground system; and
preventing the ground system from electrically coupling with the onboard power bus in response to the electrical characteristic being different than an electrical target value by a second threshold amount.

23. The method of claim 22, wherein:
the electrical characteristic comprises at least one of a frequency, a phase, and a voltage.

24. The method of claim 23, wherein the electrical target value comprises at least one of:
- 400 Hertz in response to the electrical characteristic comprising a frequency;
- 3-phase in response to the electrical characteristic comprising a phase; and
- 115 Volts Root Mean Square (RMS) in response to the electrical characteristic comprising a voltage.

25. The method of claim 22, further comprising:
determining an aircraft domain targeted by the data communications received from the ground system; and
allowing the data communications from the ground system to the aircraft domain in response to the electrical characteristic being within the second threshold amount the electrical target value and the communication characteristic being within the first threshold amount the data target value.

26. The method of claim 21, wherein:
the communication characteristic comprises a data rate of the data communications received from the ground system.

* * * * *